United States Patent [19]

Marc

[11] Patent Number: 4,750,382
[45] Date of Patent: Jun. 14, 1988

[54] FOUR-WHEEL DRIVE TRANSMISSION DEVICE

[75] Inventor: Gil R. Marc, Plaisir, France

[73] Assignee: Regie Nationale des Usines Renault, Boulogne, France

[21] Appl. No.: 923,221

[22] Filed: Oct. 27, 1986

[51] Int. Cl.[4] .......................... F16H 37/08; F16H 1/44
[52] U.S. Cl. ...................................... 74/701; 180/248; 180/249; 74/710.5
[58] Field of Search .......................... 74/700, 701, 705; 180/248, 249

[56] References Cited

U.S. PATENT DOCUMENTS

| | | | |
|---|---|---|---|
| 4,041,804 | 8/1977 | Clark | 74/711 |
| 4,431,079 | 2/1984 | Suzuki | 74/695 X |
| 4,523,495 | 6/1985 | Sala | 74/695 X |
| 4,541,503 | 9/1985 | Akutagawa et al. | 180/247 X |
| 4,601,359 | 7/1986 | Weismann et al. | 180/248 X |
| 4,644,823 | 2/1987 | Mueller | 74/710.5 |
| 4,645,029 | 2/1987 | Sasaki et al. | 180/249 |

FOREIGN PATENT DOCUMENTS 2057987  4/1981  United Kingdom ................ 180/248

OTHER PUBLICATIONS

French Patent Application, *Dispositif de Repartition de Couple, Notamment Boite Transfert de Transmission,* Inventor: Michel Jallas, date Jan. 15, 1982, No: 82 00 574, France.

*Primary Examiner*—Dirk Wright
*Attorney, Agent, or Firm*—Oblon, Fisher, Spivak, McClelland & Maier

[57] ABSTRACT

Four-wheel drive transmission device comprising at the outlet of transmission (15) a drive gear (1) driving an outer ring gear (2) which comprises an internal toothing which is the ring gear (4) of the central differential (16) whose sun gear (6) controls one of the axles (17), and whose planet carrier (18) controls the other axle, characterized in that a self-braking system is placed between the planet carrier (18) and the sun gear (16) so as to transfer automatically a portion of the energy from the axle losing adherence to the other axle.

6 Claims, 5 Drawing Sheets

FOUR-WHEEL DRIVE TRANSMISSION DEVICE

BACKGROUND OF THE INVENTION

This invention relates to a four-wheel drive transmission device which is applied particularly to passenger motor vehicles.

Numerous four-wheel drive devices are known which comprise a mechanism box at the outlet of the transmission to transmit the movement to the front axle and to the rear axle. Each axle has a differential placed between the wheels, and which receives the movement from the mechanism box. Certain devices offer, in addition, the presence of a differential between the front axle and the rear axle, this differential being placed directly at the outlet of the mechanism box. So as not to increase considerably the consumption of fuel, these mechanisms make it possible to function either in two-wheel drive or in four-wheel drive. For this reason, a control available to the driver makes it possible to go into four-wheel drive. These devices exhibit the drawback, when they are in two-wheel drive, of presenting a risk of loss of road adhesion by a wheel. In this case, the driver of the vehicle must very quickly lock the transmission of the vehicle into four-wheel drive. This clutching maneuver must be made when stopped or at very low speed. Consequently, the manipulation of these four-wheel drive devices is very difficult, and in addition it is very difficult to perform it at the best moment. Finally, this type of transmission requires the constant attention of the driver of the vehicle, which is achieved at the expense of driving safety.

SUMMARY OF THE INVENTION

The object of this invention is to propose a four-wheel drive transmission device which makes it possible to make the four-wheel drive clutching maneuver automatic; the device adapting perfectly to the adherence conditions of each of the wheels of the vehicle.

For this purpose, the four-wheel drive transmission device according to the invention comprises, at the outlet of the transmission, a drive gear which drives an outer ring gear. This outer ring gear itself comprises an internal toothing, which is in fact the ring gear of a central differential. The sun gear of this central differential controls one of the axles, and the planet carrier controls the other axle. A speed differential retardation clutch is placed between the planet carrier and the sun gear, so as to transfer automatically a portion of the energy from the axle losing adherence to the other axle.

According to an embodiment of the invention, a speed differential retardation clutch is placed on the outputs of movements of the differential of the front axle.

According to an embodiment of the invention, a speed differential retardation clutch is placed on the outputs of movements of the differential of the rear axle.

According to an embodiment of the invention, the speed differential retardation clutch is a viscous system.

According to an embodiment of the invention, the speed differential retardation clutch is a mechanical unit with initial load washers.

According to an embodiment of the invention, the speed differential retardation clutch is a mechanical unit with axial compression springs.

According to an embodiment of the invention, the engine and the transmission of the vehicle are placed crosswise in relation to the longitudinal axis of the vehicle.

According to an embodiment of the invention, the viscous system comprises a multidisk unit with a controlled-viscosity fluid which is enclosed between a hub, a ring gear, a support flange, and a closing flange, and having fluid-tightness means.

According to an embodiment of the invention, the viscous system placed on the central differential has:

its ring part which is solid with the sun gear of the central differential;

its hub which is solid with the planet carrier of said central differential;

its support flange which is solid with said ring part;

its closing flange which is solid with said sun gear;

its fluid-tightness means which consist of two seals placed between the support flange and the closing flange and said hub; and a seal placed between said sun gear and the housing of the front differential solid with the closing flange.

According to an embodiment of the invention, the viscous system placed on the central differential has:

its hub which is solid with the support flange;

its ring part which is solid with the planet carrier of said central differential;

its support flange which is solid with the sun gear of the central differential;

its closing flange which is solid with the planet carrier of said central differential;

its fluid-tightness means which consist of a seal placed between the closing flange and said hub; and a seal placed between the planet carrier of the central differential, and the support flange solid with the housing of the front differential.

According to an embodiment of the invention, the viscous system placed on the front differential has:

its hub solid with a shaft connected to one of the sun gears of the front differential;

its ring part solid with the support flange, which is connected to the other sun gear of the front differential;

its closing flange;

its fluidtight means which consist of two seals placed respectively between said hub, and the support flange and the closing flange; and a seal placed between the closing flange and said ring gear.

According to an embodiment of the invention, the ring gear of the front differential is connected to the corresponding wheel by means of a coupling plate. This coupling plate is solid with said ring gear, and it is centered in the corresponding sun gear by means of a shaft. The axial position of this coupling plate is assured by the striking of said plate against the end of said ring gear, and by a stop.

According to an embodiment of the invention, the planet carrier of the central differential comprises an outer toothing, which controls a gear. This gear is solid with the bevel countergear by a countershaft.

The four-wheel drive transmission device according to the invention thus exhibits the advantage of offering great safety. Actually, in case of loss of adherence of any one of the wheels, the transmission immediately goes to four-wheel drive. The attention of the driver can thus be solely devoted to the driving of his vehicle, which considerably increases safety, especially in case of poor weather conditions. In addition, the unit of the device is compact and lighter, which brings about a reduced cost. Finally, the device according to the invention makes possible a great flexibility of shifting of the drive torque between the front axle and rear axle.

BRIEF DESCRIPTION OF THE DRAWINGS

Other characteristics and advantages of this invention will come out from the following description of an embodiment given by way of example with reference to the accompanying drawings in which.

DETAILED DESCRIPTION OF PREFERRED EMBODIMENTS

Figure 1:
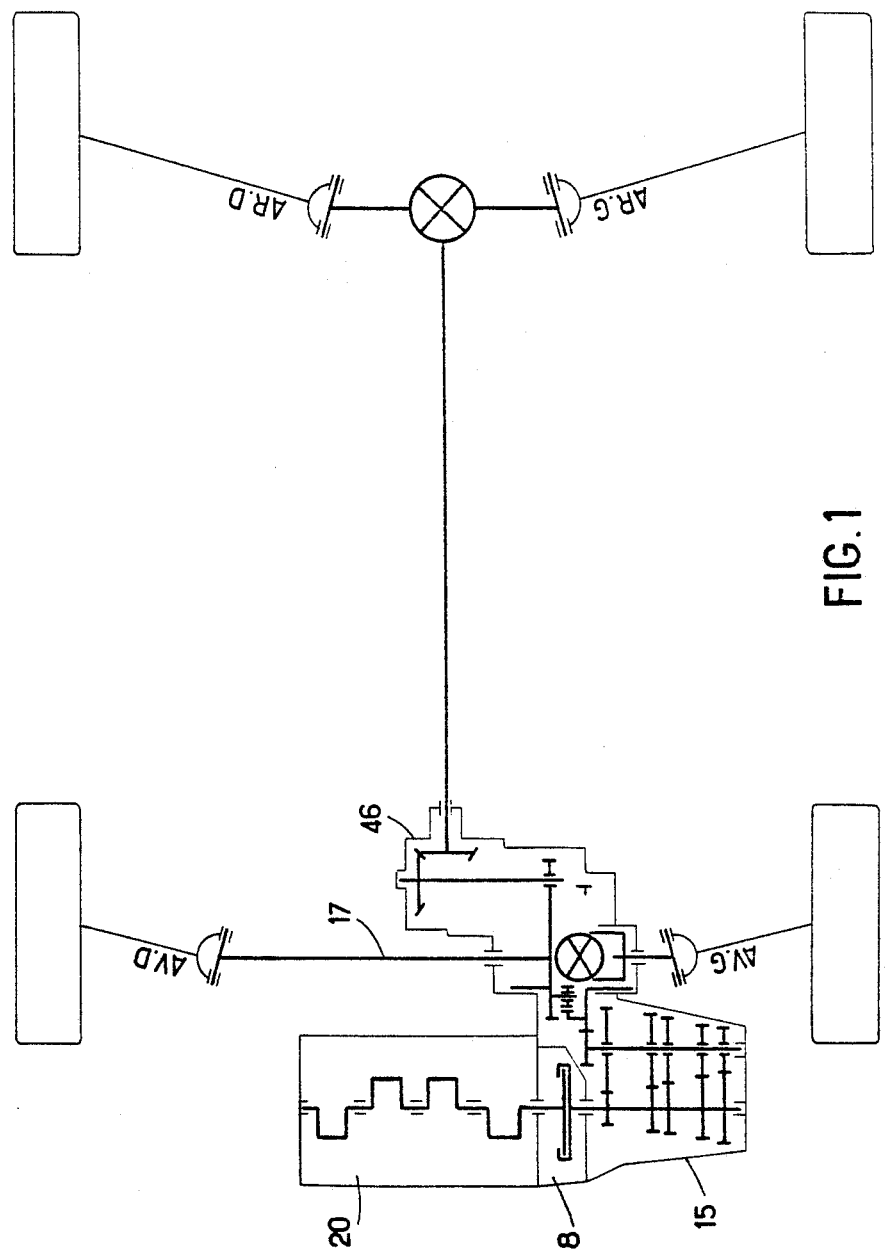
FIG. 1 is a expanded, top, outside view of the transmission unit according to the invention.

The four-wheel drive transmission device according to the invention is placed at the outlet of a transmission 15 which is driven by an engine 20. In the case of the figures, this engine 20-transmission 15 unit is placed crosswise in the vehicle. The transmission device according to the invention also applies to a power train which would be placed longitudinally in the vehicle. It should be noted also that in the case of the figures the device according to the invention is mounted on a power train placed in the front of the vehicle. It is obvious that this device could apply to a power train placed in the rear, and in this case everything that will be called front axle and rear axle in the following description would become reciprocally rear axle and front axle.

A clutch housing 8 is placed between engine 20 and transmission 15, and this clutch housing 8 is combined with housing 3 of transmission 15, and it is closed by a transmission housing 46. The unit of the device according to the invention is placed in these three housings 8, 3, and 46.

The movement output of transmission 15 drives a drive gear 1 which meshes with an outer ring gear 2. This outer ring gear 2 comprises an internal toothing, which is ring gear 4 of a central differential 16. This central differential 16 has two movement outputs, the first movement output is performed by sun gear 6 of said central differential 16, and the other movement output is performed by planet carrier 18 of said central differential 16. Sun gear 6 drives front axle 17, while planet carrier 18 drives the other axle of the vehicle, i.e., the rear axle. A speed differential retardation clutch is placed between planet carrier 18 and sun gear 6, so as to be able to transfer automatically a portion of the torque of the axle which would be losing adherence to the other axle.

In the case of the figures, the speed differential retardation clutch is a viscous coupling system 10. A speed differential retardation clutch of the mechanical unit type having initial load washers could also be mounted. A mechanical unit having compression axial springs could also be provided as the self-braking system.

Differential 19 of front axle 17, which receives torque from sun gear 6 of central differential 16, is equipped with a speed differential retardation clutch which is placed on the outputs of movement of this differential 19.

In the same way, a speed differential retardation clutch is placed on the outputs of movement of the differential of the rear axle.

Likewise for the speed differential retardation clutch placed on the outputs of central differential 16, the speed differential retardation clutch placed on differential 19 of front axle 17 or on the differential of the rear axle, these speed differential retardation clutch are of the viscous system type 12. A speed differential retardation clutch of the mechanical unit type having initial load washers could also be provided. A speed differential retardation clutch of the mechanical unit type having compression axial springs could also be provided.

The output of the movement to control the rear axle is performed from planet carrier 18 of central differential 16. This planet carrier 18 comprises an outer toothing 43, which meshes with a gear 44 to define means for driving the other axle. This gear 44 is solid with a countershaft 45, said countershaft 45 itself being solid with bevel countergear 9 for the rear wheel axle.

Viscous systems 10 and 12 shown in the figures comprise a multidisk unit 21 with interdigitated disk and a fluid having controlled viscosity, which is enclosed between a hub, a ring gear, a support flange, and a closing flange; this unit having its own fluid-tightness means. Viscous system 10 thus comprises a hub 22, s ring gear 23, a support flange 24, and a closing flange 25; and viscous system 12 comprises a hub 26, a ring gear 14, a support flange 27 and a closing flange 28.

Central differential 16 is located inside outer ring gear 2. Outer ring gear 2 is extended by a rim 31, which is unitary with a hub 32. On the side opposite this rim 31 is located planet carrier 18 which has the outer toothing 43. Groups of 2 planet gears 5 and 47 are mounted on pins 7. These pins 7 are supported on one side by planet carrier 18, and on the other side by a flange 49. This flange 49 is provided with a friction washer device 50 which presses against rim 31. Each of planet gears 5 meshes with ring gear 4, and with each of corresponding planet gears 47. Planet gears 47 in turn mesh with sun gear 6. Planet carrier 18 is supported in clutch housing 8 by bearings. Ring gear 2 is supported by its hub 32 which is engaged in bearings mounted on housing 3 of transmission 15.

Figure 2:
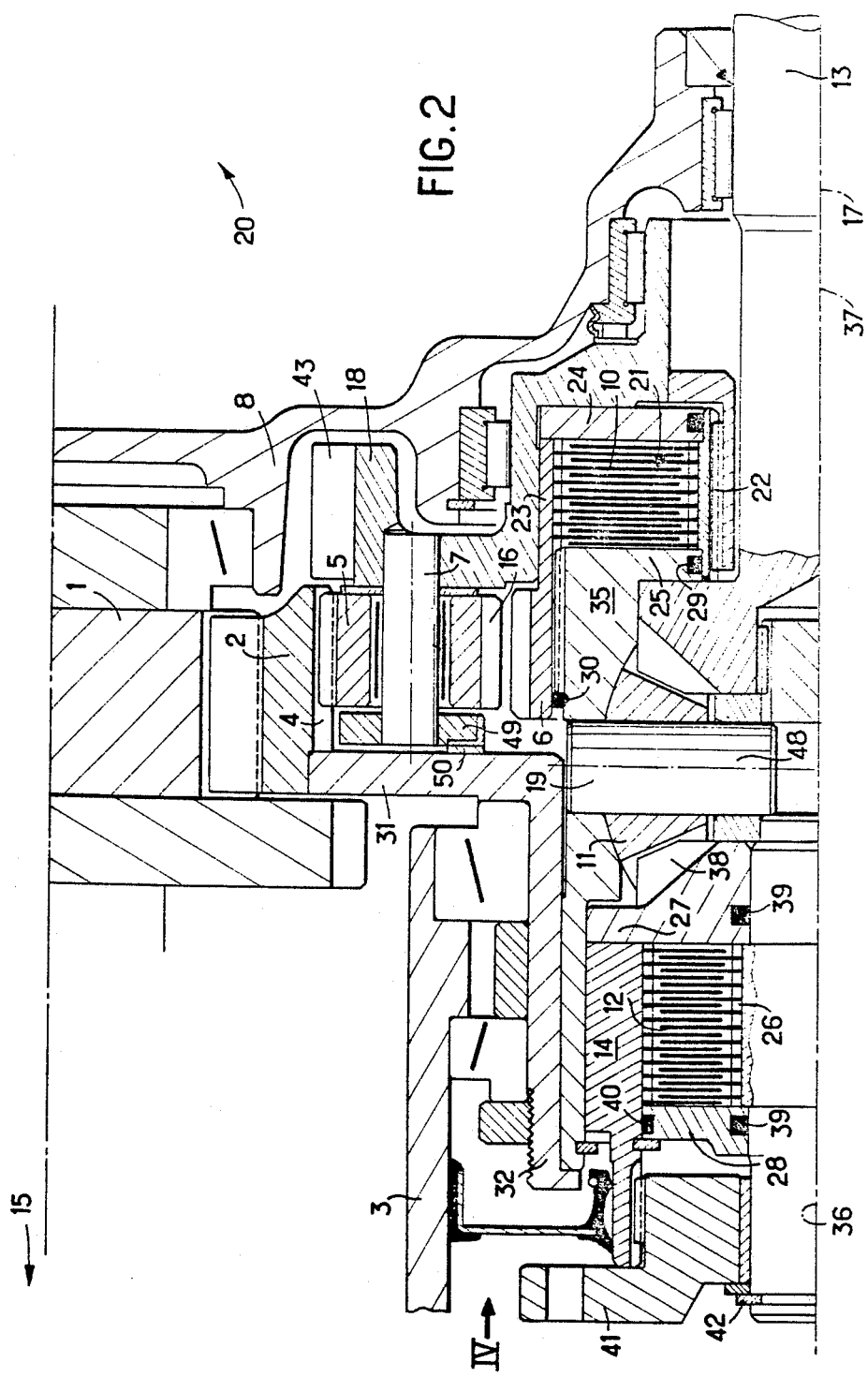
FIG. 2 is a half-view in section corresponding to FIG. 1.

FIG. 2 shows a first embodiment according to the invention of viscous system 10 which is mounted in central differential 16. In this embodiment, viscous system 10 has:

its ring part 23 which is solid with sun gear 6 of said central differential 16;

its hub 22 which is solid with planet carrier 18 of said central differential 16;

its support flange 24 which is solid with said ring part 23;

its closing flange 25 which is solid with said sun gear 6;

its fluid-tightness means which consist in two seals 29, which are placed between said support flange 24 and said closing flange 25 and for each of these flanges with said hub 22; and a seal 30 placed between said sun gear 6 and housing 35 of front differential 19; said housing 35 being solid with closing flange 25.

In the illustrated embodiment, hub 22 is splined to planet carrier 18, and in the same way closing flange 25 which is extended by housing 35 is solid with sun gear 6 by means of splines. In addition, it should be noted that ring part 23 and support flange 24 are engaged inside planet carrier 18, and that also ring part 23 is centered inside this planet carrier 18.

Figure 3:
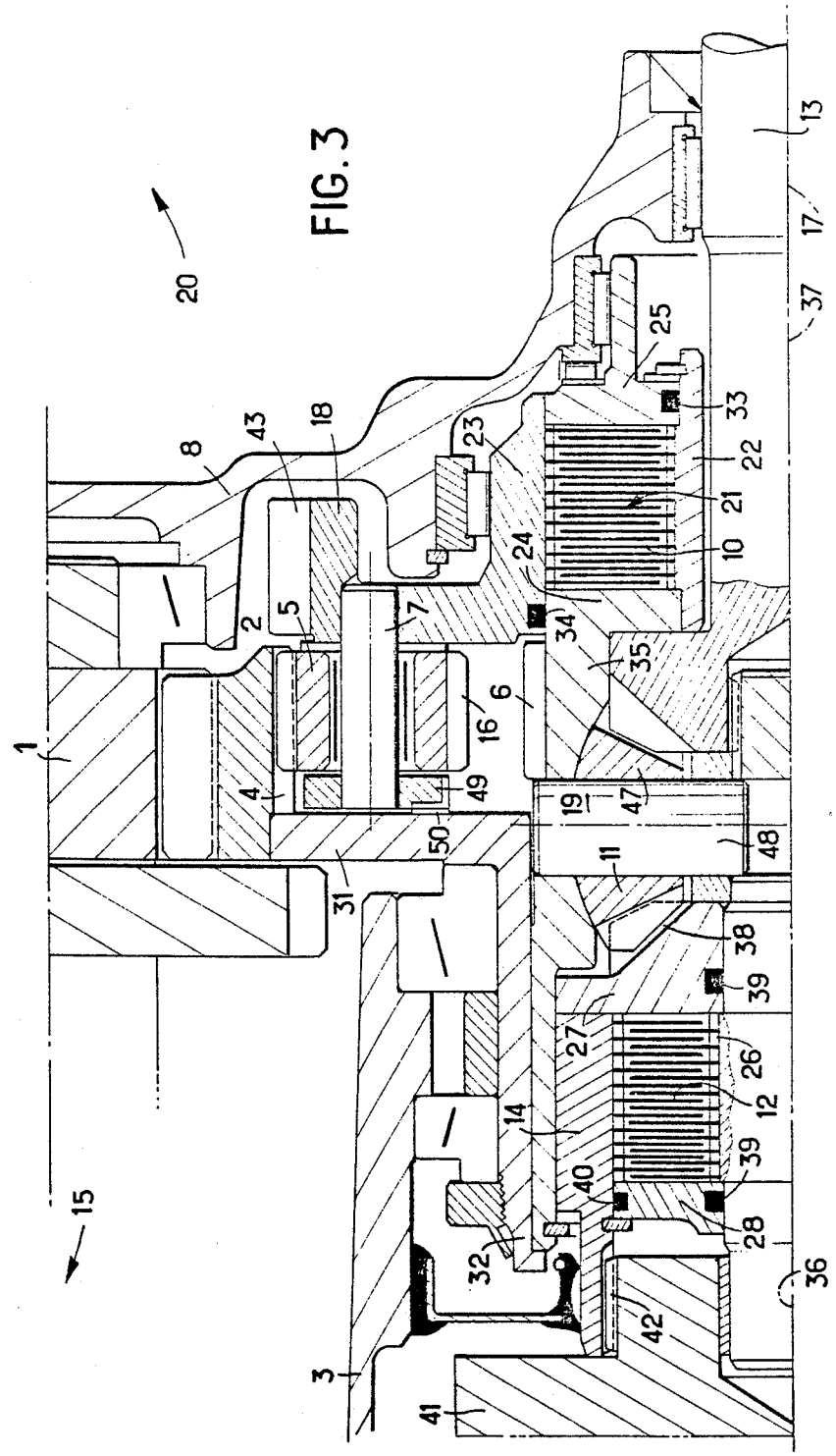
FIG. 3 is a half-view in section corresponding to FIG. 1 of another embodiment.
Figure 4:
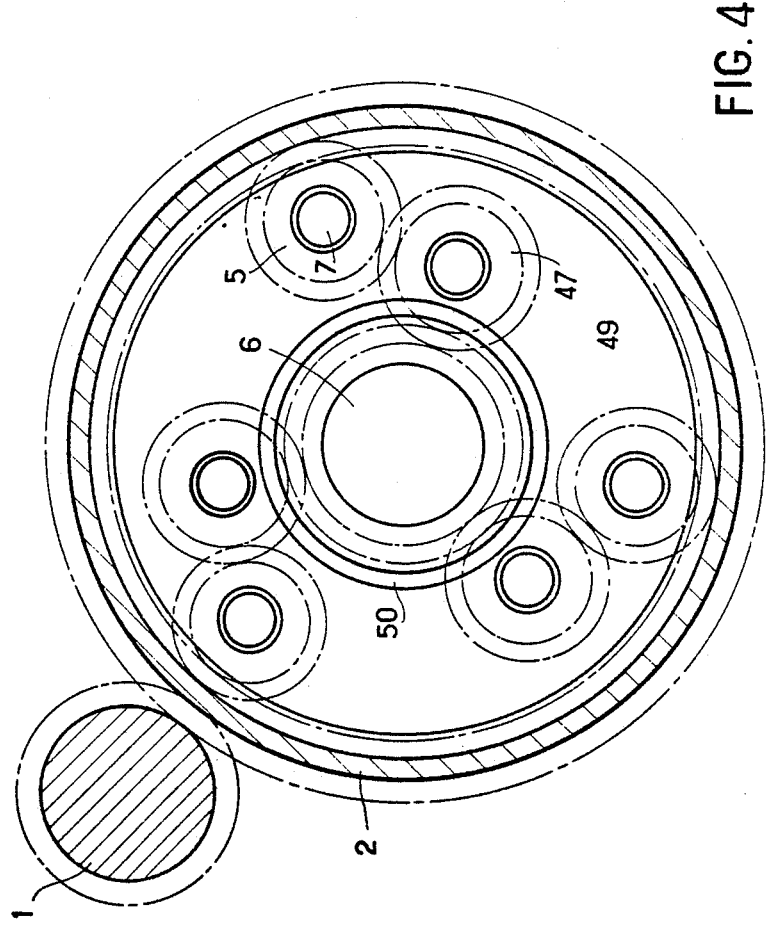
FIG. 4 is a view along IV of FIG. 2.
Figure 5:
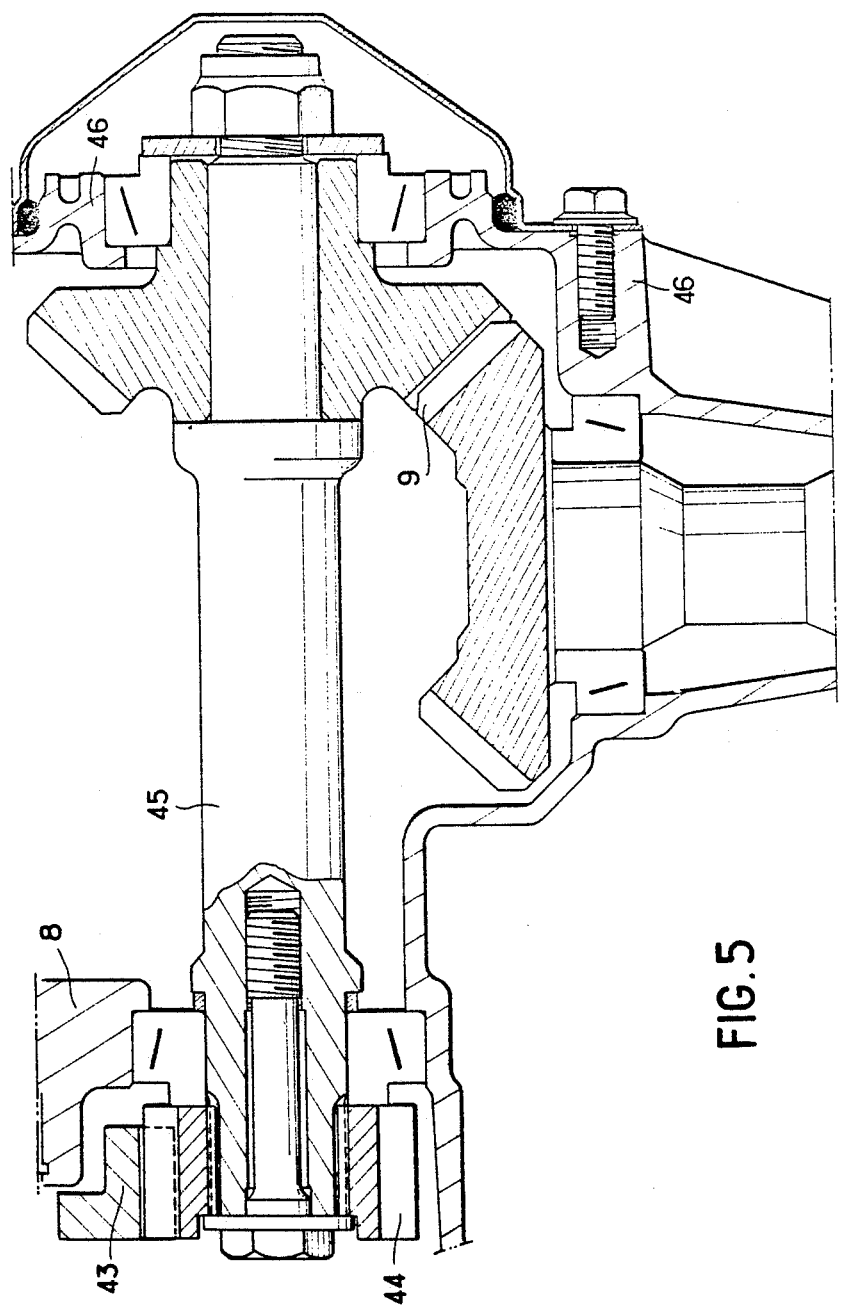
FIG. 5 is a view in section corresponding to a portion of FIG. 1.

Another embodiment of viscous system 10, which is placed on central differential 16, is seen in FIG. 3. In this embodiment, viscous system 10 has:

its hub 22 which is solid with support flange 24;

its ring gear 23 which is splined to planet carrier 18 of said central differential 16;

its support flange 24 which is solid with sun gear 6 of said central differential 16;

its closing flange 25 which is solid with planet carrier 18 of said central differential 16;

its fluid-tightness means, which consist of a seal 33 placed between said closing flange 25 and said hub 22; and a seal 34 which is placed between said planet carrier 18 of said central differential 16 and said support flange 24 solid with housing 35 of front differential 19.

In an embodiment of the invention which is shown in FIGS. 2 and 3; differential 19 of front axle 17 and its viscous system 12 are both mounted inside sun gear 6 and hub 32 of outer ring gear 2. Thus, outer ring gear 2, central differential 16 with its viscous system 10, front differential 19 with its viscous system 12, all these elements are coaxial, and have as an axis the axis of front axle 17.

Front differential 19 has its housing 35 which carries planet gears 11 by pins 48. These planet gears 11 mesh on the one side with a sun gear 37, which is solid with a front output shaft 13. This sun gear 37 is mounted on one side of viscous system 10. Planet gears 11 mesh on the other hand with a sun gear 38, which is mounted on a shaft 36. This shaft 36 extends so as to be mounted coaxial with sun gear 37, and as to be solid with this sun gear 37 by means of splines. The other end of shaft 36 is engaged in a coupling plate 41. This coupling plate 41 thus is centered on shaft 36, and it constitutes means for the second output of movement of front axle 17.

Viscous system 12 which is placed on front differential 19, is mounted inside the extension of housing 35. This housing extension 35 is itself mounted inside hub 32 of outer ring gear 2. The viscous system 12 has:

its hub 26, which is solid with shaft 36, and which in the case of the figures is unified with this shaft 36;

its ring gear 14 which is solid with support flange 27, which is connected to sun gear 38;

its closing flange 28;

its fluid-tightness means which consist of two seals 39 placed respectively between said hub 26, i.e., shaft 36 and said support flange 27, and said closing flange 28; and a seal 40 placed between said closing flange 28 and said ring gear 14.

Ring part 14 of viscous system 12 is solid with coupling plate 41 by grooves. This coupling plate 41 is mounted inside said ring part 14. Hub 41 thus assures one of the outputs of movement of front differential 19, and it is connected to the corresponding wheel. Coupling plate 41 is centered in sun gear 38 by means of shaft 36. The axial position of coupling plate 41 is assured by the striking of said plate 41 against the end of said ring gear 14. A stop 42 assures this axial position, and this stop 42 is placed on the end of shaft 36.

I claim:

1. A compact four wheel drive device in a transmission including a drive gear as an output thereof, comprising:
   one axle;
   a central differential coaxial with said one axle, said central differential including a planet carrier, a plurality of planet elements mounted on said planet carrier, a sun gear, and a ring gear meshing with said drive gear, said planet carrier defining tooth means for driving another axle;
   an axle differential for said said one axle, said axle differential including a housing connected to said sun gear of said central differential and carrying at least one planet gear pin, said housing being coaxial with said one axle and extending substantially entirely radially within said sun gear of said central differential;
   a unitary rim and hub drivingly connecting said housing with said ring gear of said central differential;
   one speed differential retardation clutch connected between said sun gear of said central differential and said planet carrier whereby a speed differential between said one axle and said another axle is retarded, wherein said one clutch is positioned entirely radially within said sun gear of said central differential and between said housing and said planet carrier relative to the axis of said one axle; and
   axle output means coaxial with said one axle and connected to a sun gear of said axle differential; and
   another speed differential retardation clutch connected between said one axle and said axle output means whereby a speed differential between said one axle and said axle output means is retarded, wherein said another clutch is positioned entirely radially within said housing.

2. The device of claim 1 including a speed differential retardation clutch associated with said another axle.

3. The device of claim 1 wherein each of said speed differential retardation clutches comprises a viscous coupling.

4. The device of claim 1 traversely mounted in a vehicle.

5. The device of claim 3 wherein each said viscous coupling comprises a plurality of interdigitated disks, a viscous fluid and sealing means.

6. The device of claim 1 wherein said axle output means comprises:
   a coupling plate rotatably mounted on said one axle; and
   stop means for axially positioning said coupling plate.

* * * * *

UNITED STATES PATENT AND TRADEMARK OFFICE
CERTIFICATE OF CORRECTION

PATENT NO. : 4,750,382

DATED : Jun. 14, 1988

INVENTOR(S) : Robert M. GIL

It is certified that error appears in the above-identified patent and that said Letters Patent is hereby corrected as shown below: On the Title Page The inventor's name is incorrect. It should read as follows:

-- Robert M. Gil --

Signed and Sealed this

First Day of November, 1988

Attest:

DONALD J. QUIGG

*Attesting Officer*  *Commissioner of Patents and Trademarks*